United States Patent [19]

Menihan et al.

[11] Patent Number: 5,125,945
[45] Date of Patent: Jun. 30, 1992

[54] METHOD AND APPARATUS FOR PARALLEL ALIGNMENT OF OPPOSING MOLD SURFACES BY CONTROLLING THE THERMAL EXPANSION OF THE APPARATUS

[75] Inventors: Robert M. Menihan; Richard B. Pitbladdo, both of Corning; Jackson P. Trentelman, Painted Post, all of N.Y.

[73] Assignee: Corning Incorporated, Corning, N.Y.

[21] Appl. No.: 682,553

[22] Filed: Apr. 9, 1991

[51] Int. Cl.$^5$ ............................................. C03B 11/00
[52] U.S. Cl. ........................................ 65/66; 65/102; 65/323; 65/319; 65/356; 264/327; 425/406
[58] Field of Search ................... 264/327; 425/406, 88; 100/93 P; 65/323, 62, 66, 356, 355, 319, 102, 162

[56] References Cited

U.S. PATENT DOCUMENTS

| 3,244,497 | 4/1966 | Copeland | 65/356 |
|---|---|---|---|
| 4,648,823 | 3/1987 | Yashima | 425/406 |
| 4,696,692 | 9/1987 | Schmitt | 65/102 |

Primary Examiner—W. Gary Jones
Assistant Examiner—John Hoffmann
Attorney, Agent, or Firm—Timothy M. Schaeberle; Clinton S. Janes, Jr.

[57] ABSTRACT

In a mold apparatus, the receiving molding surface and the opposing molding surface are each mounted coaxially and in sliding fashion within an alignment means. Both of these alignment means have an equal number of spaced apart alignment pads which are positioned such that opposing pads will be in cooperable engagement with each other during pressing.

Utilizing the disclosed apparatus, a method for molding precisely shaped articles, such as magnetic memory disc substrates which require precisely parallel, opposite molded surfaces, is described. Simply stated, the method utilizes the alignment pads' thermal expansion characteristics to induce a controlled level of thermal distortion to obtain pad lengths which result in parallel opposing molding surfaces. There are two methods for accomplishing this pad length required for parallel molding surfaces: the first method, controlled heating, consists of introducing heat to a pad to cause it to expand, thereby extending the length thereof; the second method, controlled cooling, consists of introducing cooling to a pad to cause it to contract, thereby shortening the length thereof.

Once pad lengths are adjusted and thus the molding surfaces are parallel, the glass article may be pressed. This method is suitable for press molding any glass article which requires parallel opposing surfaces, regardless of the article's thickness.

8 Claims, 3 Drawing Sheets

METHOD AND APPARATUS FOR PARALLEL ALIGNMENT OF OPPOSING MOLD SURFACES BY CONTROLLING THE THERMAL EXPANSION OF THE APPARATUS

RELATED APPLICATIONS

U.S. Ser. No. 07/682,556, filed concurrently herewith by J. Trentelman under the title Method of Press Molding Near Net-Shape Glass Articles is directed toward a method of press molding resulting in symmetric heat removal from a molten glass charge. U.S. Ser. No. 07/682,657, filed concurrently herewith by Blakeslee et al. under the title Method of Forming Thin, Flat Glass-Ceramic Articles is directed toward the production of thin glass-ceramic articles suitable as flat substrates for use in magnetic memory disc applications.

BACKGROUND OF THE INVENTION

Our invention relates to an apparatus and a method for molding precisely shaped articles, which require precisely parallel, opposite molded surfaces. More particularly, this invention pertains to a method and an apparatus for parallel aligning of opposing mold surfaces for use in pressing glass or glass-ceramic articles with parallel opposing surfaces.

Articles, such as glass magnetic memory disk substrates for example, must be formed with two surfaces, top and bottom, both substantially flat and parallel. In a process that forms the substrate by pressing a measured volume of molten glass between two tools, i.e., a receiving and opposing portion, it is difficult to produce a part where the sides are exactly parallel. Major sources of this error are: fabrication tolerances in the machine and tools; unbalanced forces on the machine and tools which cause uneven physical deflection; and unbalanced heating of the machine and tools which cause uneven thermal expansion.

All rational effort is made to make the machine with parallel tool mounting surfaces, to place the measured volume of glass on the molding surfaces such that the physical deflection is symmetrical, and to minimize unbalanced heating of the machine. Regardless of this effort, however, parallel tool surfaces are not always attained. For example, in the typical glass pressing environment thermal distortion is caused by unstable temperature conditions in the pressing room. One flank of either the press's receiving or opposing portion,s alignment ring faces the hot orifice, while the opposite flank faces the cool air in the press room. This temperature imbalance affects the expansion rate of the alignment ring pads located on the receiving and opposing portions. The pads which face the hot orifice expand and lengthen at a higher rate than the pads facing away. When the thermally distorted pads on the receiving and opposing alignment rings touch, the gap between the receiving and opposing portion surfaces will no longer be parallel. Any parts formed while thermal distortion is present will exhibit a glass aberration called wedge.

The present invention is directed toward correcting this prior art problem of wedge. This invention uses the phenomenon of one of these sources of error to compensate for the errors of the others, namely; tc control the unbalanced heating of the machine in a manner to use thermal expansion to correct for the other sources of error. This invention uses preferential heating and/or cooling of the machine to introduce thermal expansions in the opposite direction of the uncompensated error sources to make the tool surfaces parallel during forming of the substrate.

SUMMARY OF THE INVENTION

Whereas a mold assembly comprising several interacting parts can be designed to be operable in the inventive process, as a matter of convenience and in the interest of simplicity, the following description will be directed to a two-part mold. The first part is termed the receiving portion because the viscous molten glass is initially brought into contact with the receiving portion's molding surface, and the second part is termed the opposing portion because its molding surface is positioned opposite to the receiving molding surface and is brought into contact with the molten glass after the latter has been placed in the receiving molding surface. The receiving molding surface and the opposing molding surface are each mounted coaxially and in sliding fashion within an alignment means. Both of these alignment means have an equal number of spaced apart alignment pads which are positioned such that opposing pads will be in cooperable engagement with each other during pressing.

Utilizing the disclosed apparatus, a method for molding precisely shaped articles, such as magnetic memory disc substrates which require precisely parallel, opposite molded surfaces, is described. Simply stated, the method utilizes the alignment pads, thermal expansion characteristics to induce a controlled level of thermal distortion to obtain pad lengths which result in parallel opposing molding surfaces. There are two means for accomplishing this pad length required for parallel molding surfaces: the first method, controlled heating, consists of introducing heat to a pad to cause it to expand, thereby extending the length thereof; the second method, controlled cooling, consists of introducing cooling to a pad to cause it to contract, thereby shortening the length thereof. It will be appreciated that a pad may be equipped with either a heating means, conveniently supplied through an electric current, or a cooling means, conveniently applied through the passage of a steam of cool air, or may be equipped with both means. Advantageously, each pad will contain a means for thermally varying the length thereof, thereby providing the greatest capability in assuring the proper cooperable engagement to yield articles exhibiting surfaces of the most exact parallelism, but such is not absolutely necessary. That is, one or more pads may be fabricated in a fixed position, the parallelism of the molded product being achieved through the movement of the other pads having thermal control means.

Once pad lengths are adjusted and thus the molding surfaces are parallel, the material to be pressed can be placed in the mold assembly and the opposing and receiving portions brought into essential contact with each other, thereby pressing said material to form the desired article possessing parallel opposing surfaces. This method is suitable for press molding any glass article which possesses parallel opposing surfaces, regardless of the article's thickness.

PRIOR ART

U.S. Pat. No. 3,390,974 (Parsons et al.) describes an arrangement for the alignment or centering of two machine parts, a mold and a plunger, about a desired center in which one of the machine parts is floatingly mounted with respect to the other and in which the alignment is accomplished by pins rigidly attached to one of the parts and engaging holes in jig bored slidable bushings in the other of the parts. Unlike the present invention, this alignment arrangement is directed towards controlling horizontal positioning rather than vertical.

U.S. Pat. No. 4,696,692 (Schmitt), further refined by U.S. Pat. No. 4,941,906 (Schmitt), describes a multi-part mold assembly for molding glass lenses. This mold assembly contains a cylindrical sleeve between the top and bottom molds which has three cut-outs at each end forming alignment pads. These alignment pads, spaced equally circumferential about the Z axis, constrain the top and bottom molds against rotation about the X and Y axis which are orthogonal to the direction of the mold closure. Additionally, a torus on the top mold and a torus on the bottom mold bear against a cylindrical inner surface of the sleeve to precisely align the molds in the X and Y directions. The two sets of alignment pads themselves set the closed vertical position, i.e., Z direction movement, by their contact with the opposing mold halves. Although this invention does restrict the vertical movement with its alignment pads, these pads do not possess a thermal component for changing pad length which, in turn, compensates for either thermal distortion or other sources of error causing vertical tool distortion.

U.S. Pat. No. 4,797,144 (DeMeritt et al.) describes a method and apparatus for molding precision optical elements having complex and concave surfaces requiring the apportionment of relative movement between two opposing mold surfaces. First and second molds are contained within a floating alignment sleeve, thereby defining a mold cavity. The first mold is moved in the alignment sleeve until stopped by a calibrated standoff, and pressing is accomplished by the second mold moving in the alignment sleeve until opposing surfaces are completely formed at substantially the same time. Again, the main thrust of the alignment method/apparatus is to provide for alignment in the vertical direction through the use of the floating sleeve, rather than in the horizontal. Although the vertical is controlled somewhat by the calibrated standoff in conjunction with the measured volume of glass, there is no mention of using thermal means to compensate for thermal distortion as well as other sources of error.

DESCRIPTION OF THE PREFERRED EMBODIMENT

Figure 1:
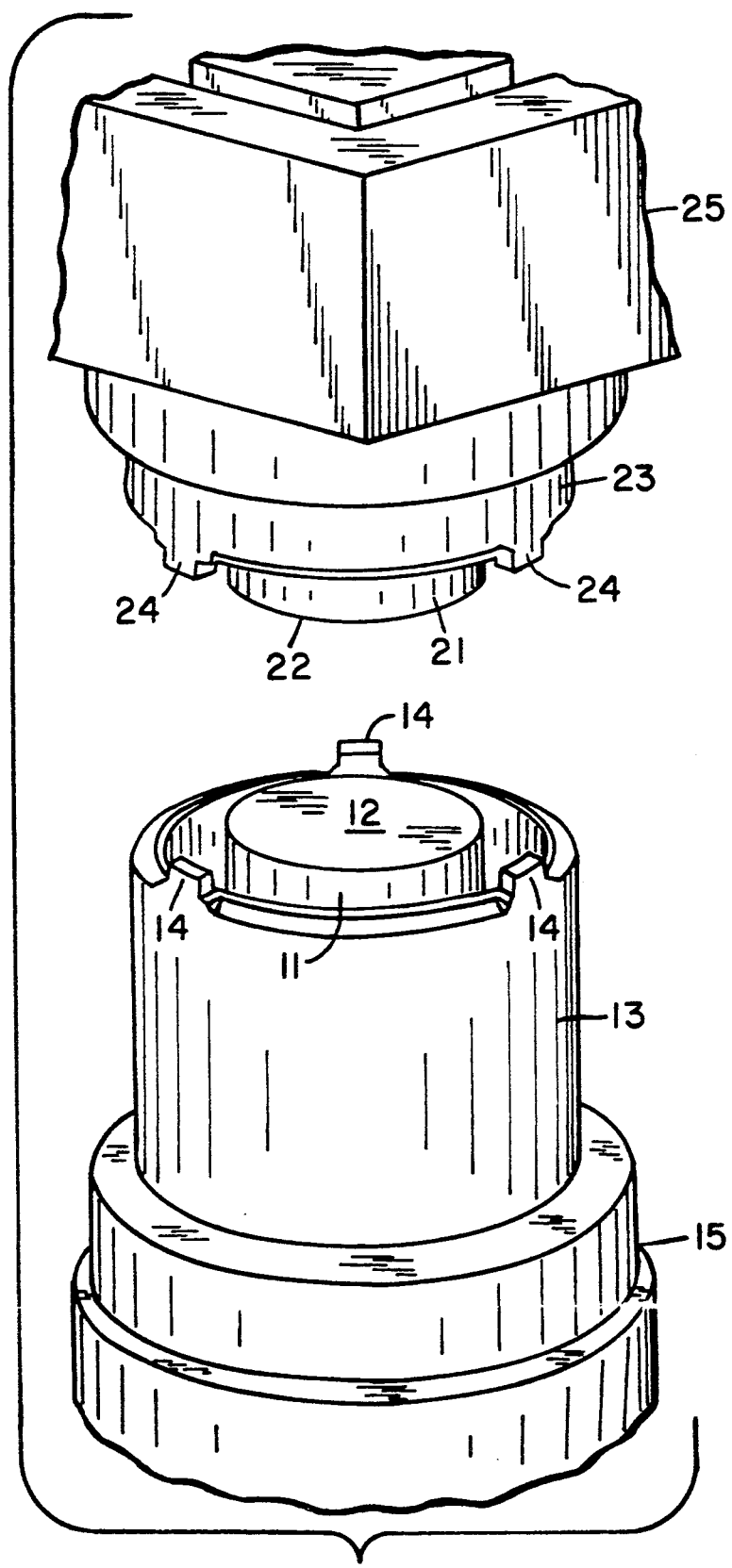
FIG. 1 is a partial perspective of the view of the mold assembly.
Figure 5:
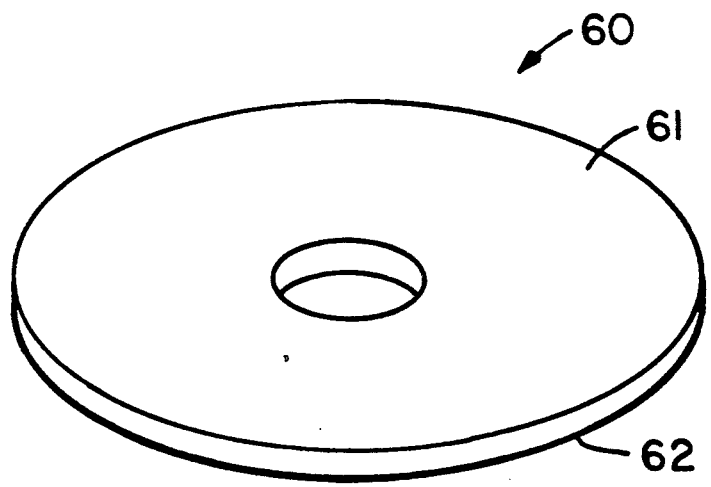
FIG. 5 is a perspective view of disk-shaped article—a magnetic memory disk—typically produced by this apparatus and method.

FIG. 1 shows a multi part mold assembly for pressing material, such as molten glass, into desired shapes possessing opposing surfaces. (surfaces 61 and 62 in FIG. 5). A representative article would be that of a flat disk-shaped glass article such as the magnetic memory disk 60 shown in FIG. 5. This press molding method is particularly suited to these types of disc-shaped articles because of their requirement of parallel opposing surfaces.

In accordance with the present invention, as illustrated in FIG. 1 a bottom mold 11 with a flat molding surface 12 is mounted in a sliding and concentric fashion within a bottom cylindrical alignment means 13; the means used in the preferred embodiment is a sleeve-like device. The top mold 21 similarly, has a flat molding surface 22 mounted in a concentric fashion within a top cylindrical alignment sleeve 23. Both the bottom and top alignment means, 13 and 23, are housed in sliding and concentric fashion within respective mounting means 15 and 25. These mounting means are then either secured in a horizontal fixed position or mounted in movable fashion that allows the respective alignment means a freedom of movement to facilitate the cooperable engagement of the alignment means. Preferably the bottom mounting means 15 is maintained in a fixed position while the top mounting means 25 is secured in a universal joint type arrangement (not shown) allowing the top mold portion a limited freedom of movement.

These alignment means 13, 23 have preferably, three alignment pads; the bottom alignment sleeve pads 14 are positioned for cooperable engagement with the top alignment sleeve pads 24 (only two shown). Although the alignment pads are preferably equally spaced around the circumference of their respective sleeves, it is important that the locus of points connecting the three bottom pads and the locus connecting the three top pads encloses the axis along which the molds 11 and 21 move toward and away each other. The preferred material for these alignment sleeves is stainless steel.

Figure 2:
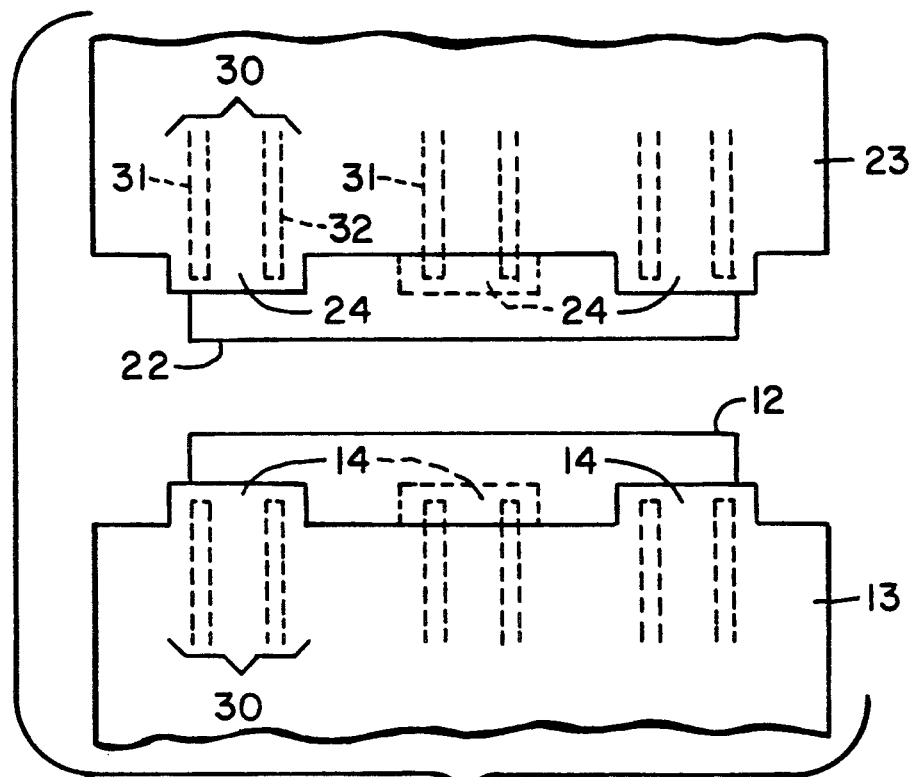
FIG. 2 is a side view of the "controlled heating" type mold assembly in its open position.
Figure 3:
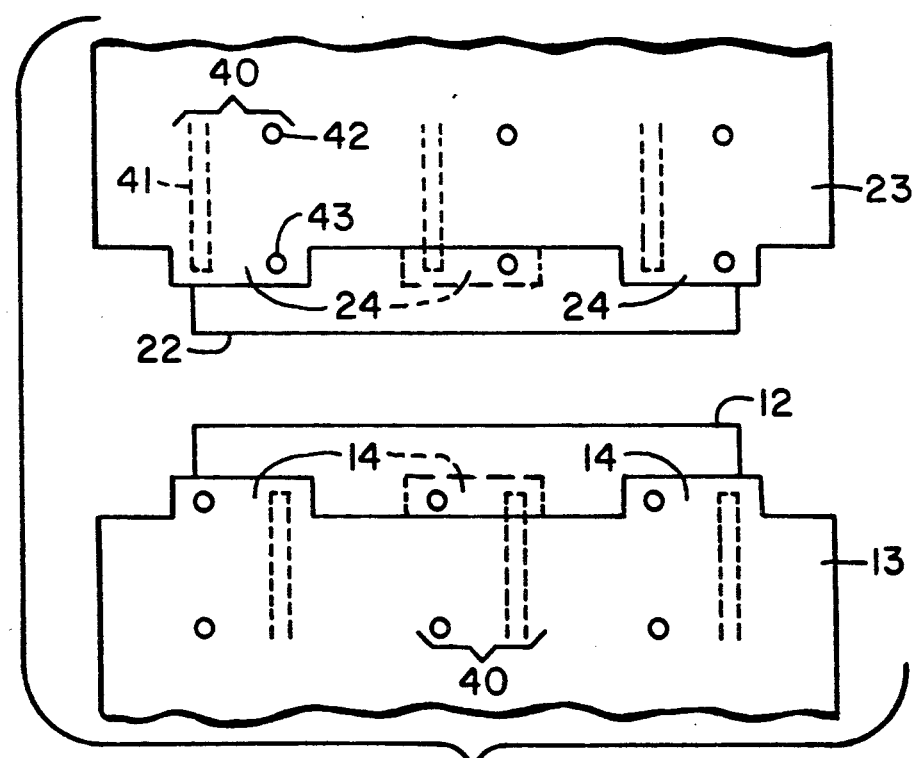
FIG. 3 is a side view of the "controlled cooling" type mold assembly in its open position.
Figure 4:
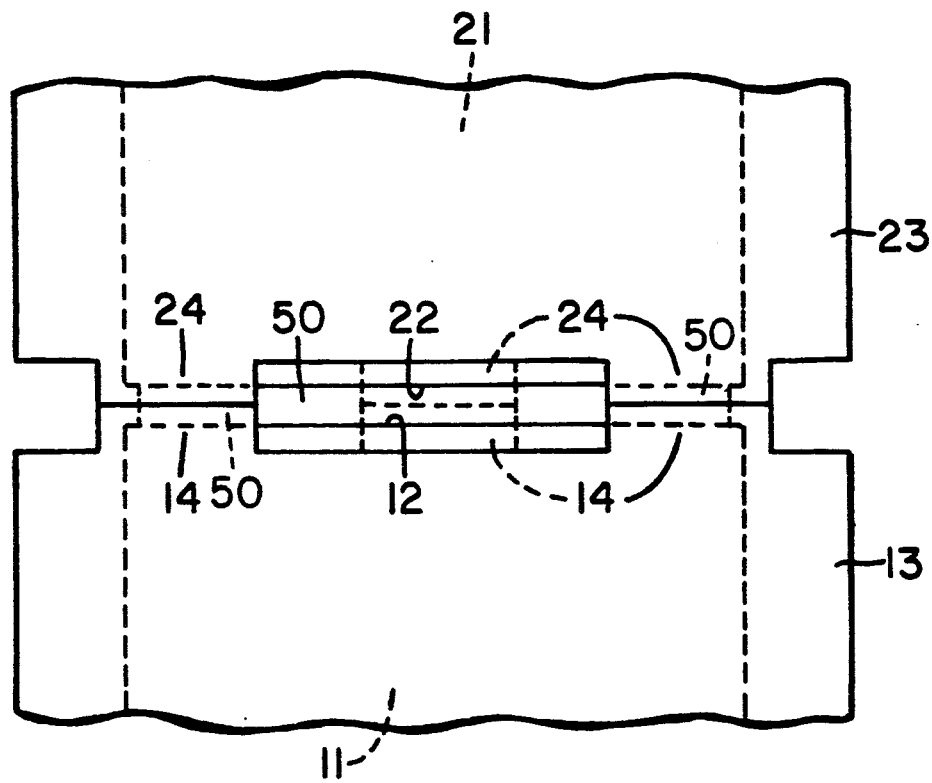
FIG. 4 is similar to FIG. 2, but shows the mold assembly in its fully closed position.

Referring now to FIGS. 2 and 3, within each alignment sleeve's pads is located a means 24 for thermally controlling the length of pads 24. The preferred embodiment comprises two different means for controlling pad length, with both methods utilizing the pads' thermal expansion characteristics to induce a controlled level of thermal distortion. The first method, controlled heating, consists of introducing additional heat to certain pads in order to achieve the desired parallel molding surfaces. Controlled cooling, the second method, consists of cooling certain pads to again obtain the desired result of parallel molding surfaces.

Referring specifically now to FIG. 2, within each of the six top and bottom alignment sleeve pads 24 and 14 is located means for thermally controlling pad length which includes a thermocouple 31 for monitoring pad temperature, i.e., pad length, and a thermal means for changing the temperature and thus the length of the pad 32. The thermal means for effecting pad temperature change consists of electrical heating element connected to a variable power supply.

Looking now at FIG. 3, illustrating the second embodiment, within each of the six top and bottom alignment sleeve pads 24 and 14 is located a means for thermally controlling pad length 40 consisting of a thermocouple 41 and and a means for thermally changing the pad length which itself consists of an inlet air passage 42 and an outlet air passage 43. Again, the thermocouple 41 would monitor alignment sleeve pad temperatures. However, in this second embodiment rather than heating the pads to effect pad length change, the thermal means for effecting pad length change consists of cooling the pads.

The following text comprises a description of the molding of a disc-shaped glass article designed for use as a substrate in magnetic memory storage devices as performed in a laboratory setting. As is implicit in the inventive method, the molding of an article exhibiting parallel opposing surfaces requires means for measuring parallelism. While sophisticated optical measuring techniques can be devised for this purpose, we manually measured the parallelism of molded glass discs utilizing several passes across the surfaces thereof with a Vernier micrometer. We determined that, with care, repeatable measurements to 0.00005" (~0.0013 mm) can be obtained. Thus, by utilizing that manual measuring technique, we have been able to mold the above-described disc-shaped articles wherein the parallelism of the opposing surface exhibits about a 1-3 micron thickness variation across a diameter of 5" (~127 mm).

As can be seen, a disc demonstrating the desired parallelism in the opposing surfaces was formed through a trial-and-error process. That is, a charge of molten glass of the required volume to yield the glass disc was delivered into bottom mold 11. Bottom or receiving mold 11 was mounted in a sliding and concentric fashion within alignment means 13 which, in turn, was mounted in a sliding and concentric fashion within mounting means 15. Means 15 was mounted in a stationary manner. Top mold 21 was mounted in a fixed relation to and within alignment means 23 which, in turn, was mounted in concentric fashion within mounting means 25. Unlike means 15, however, means 25 was mounted in a manner to permit freedom of angular movement. Thus, means 25 must be capable of movement to assure the all-important cooperable engagement between bottom alignment sleeve pads 14 and top alignment sleeve pads 24. In operation, pads 14 and 24 are bro into contact and bottom mold 11 was raised into proximate contact with top mold 21, thereby pressing the charge of molten glass between respective molding surfaces 12, 22 to produce glass disc 50.

As was observed above, in our laboratory setting, the need for heating and cooling the alignment pads 14 and 24 was determined on an ad hoc or trial-and-error basis. That is, the pads were experimentally heated/cooled until a disc having opposing surfaces of the proper parallelism was obtained. Once the desired product was secured, maintenance of the temperature of each pad was controlled through thermocouples connected any type of control system.

One type of control system which was utilized included the use host computer (not shown) which could recognize variances in thermocouple readings. This computer would control a variable power supply (also not shown) which would supply the current or cooling air as needed to adjust the pads until each pad,s temperature reached its set point, generated through the ad hoc basis, and thus required for parallel molding surfaces.

While a particular embodiment of the invention has been and described, various modifications are within the scope of the invention. The appended claims are, therefore, intended to cover all such modifications.

We claim:

1. A method for aligning a mold assembly's receiving and opposing press molding surfaces such that they are substantially parallel to each other, wherein said molding surfaces are mounted within separate alignment means, at least one of the molding surfaces being mounted in a sliding fashion, said alignment means are in a spaced relationship opposite each other and each alignment means contains cooperably engaging alignment pads which contact each other upon pressing, said method comprising:
    thermally adjusting said alignment pads' lengths resulting in the receiving and opposing molding surfaces being substantially parallel to each other.

2. The method as claimed in claim 1 wherein the lengths of the alignment pads are thermally adjusted through the use of a heating means.

3. The method as claimed in claim 1 wherein the lengths of the alignment pads are thermally adjusted through the use of a cooling means.

4. A multi-part mold assembly for molding articles with opposing surfaces substantially parallel to each other comprising:
    a receiving molding surface mounted in a coaxial fashion within a first cylindrical alignment means;
    an opposing molding surface mounted in coaxial fashion within a second cylindrical alignment means;
    at least one of said molding surfaces mounted within said alignment means in a sliding fashion
    both of said aignment means having an equal number of spaced apart flat alignment pad formed thereon, wherein the alignment pads of first alignment means are positioned for cooperable engagement with the alignment pads of second alignment means;
    means for thermally adjusting pad length to induce said alignment pads to change length in order to cause said opposing and receiving molding surfaces to become substantially parallel to each other;
    means for causing alignment pads of the first alignment means to contact, in cooperable engagement, the alignment pads of the second alignment means and for subsequently bringing said opposing molding surface into proximate contact with said receiving molding surface.

5. The mold assembly as claimed in claim 4 wherein each means for thermally adjusting pad length is comprised of temperature measurement means located within the alignment pads and a thermal means for changing the temperature of the alignment pads thus inducing a dimensional change in the alignment pads.

6. The mold assembly as claimed in claim 5 wherein the thermal means is comprised of a means for heating the alignment pad.

7. The mold assembly as claimed in claim 5 wherein the thermal means is comprised of a means for cooling the alignment pad.

8. The mold assembly as claimed in claim 4 wherein said first and second alignment means are housed in a mounting means which allows for for cooperable engagement between alignment pads of the first and second alignment means.

* * * * *